US008778123B1

(12) United States Patent
Hultgren et al.

(10) Patent No.: US 8,778,123 B1
(45) Date of Patent: Jul. 15, 2014

(54) CARBON FIBER TUBULAR POLE AND METHOD OF MANUFACTURE

(71) Applicants: Nanette L Hultgren, Palmetto, FL (US); Steven C Austin, Plametto, FL (US)

(72) Inventors: Nanette L Hultgren, Palmetto, FL (US); Steven C Austin, Plametto, FL (US)

( * ) Notice: Subject to any disclaimer, the term of this patent is extended or adjusted under 35 U.S.C. 154(b) by 0 days.

(21) Appl. No.: 13/841,360

(22) Filed: Mar. 15, 2013

Related U.S. Application Data

(63) Continuation-in-part of application No. 13/328,289, filed on Dec. 16, 2011.

(51) Int. Cl.
*B29C 65/00* (2006.01)
*B32B 37/00* (2006.01)
*B32B 38/10* (2006.01)
*A61F 13/15* (2006.01)
*B65H 81/00* (2006.01)
*B29D 22/00* (2006.01)
*B65C 3/16* (2006.01)
*B32B 27/00* (2006.01)

(52) U.S. Cl.
USPC ........... 156/294; 156/153; 156/161; 156/165; 156/213; 156/215; 156/229; 156/247; 156/280; 156/296

(58) Field of Classification Search
USPC ........... 156/60, 148, 149, 153, 160, 161, 165, 156/184, 185, 187, 188, 189, 190, 191, 196, 156/212, 213, 215, 217, 218, 229, 247, 249, 156/278, 280, 289, 293, 294, 296, 303.1, 156/307.1, 307.3, 307.7, 701
See application file for complete search history.

(56) References Cited

U.S. PATENT DOCUMENTS 3,673,029 A * 6/1972 McLarty ................. 156/175
4,647,326 A * 3/1987 Pott ........................ 156/77
5,645,668 A * 7/1997 Lin et al. ................. 156/175

* cited by examiner

*Primary Examiner* — Philip Tucker
*Assistant Examiner* — Brian R Slawski
(74) *Attorney, Agent, or Firm* — Frijouf, Rust & Pyle, P.A.

(57) ABSTRACT

A carbon fiber tubular pole and method of construction thereof. The pole includes a left in place lightweight mandrel, preferably formed of tubular polyvinylchloride or cardboard, which substantially reduces cost of manufacture. A socket is formed in the carbon fiber tubular pole for receiving an adjacent carbon fiber tubular pole.

4 Claims, 19 Drawing Sheets

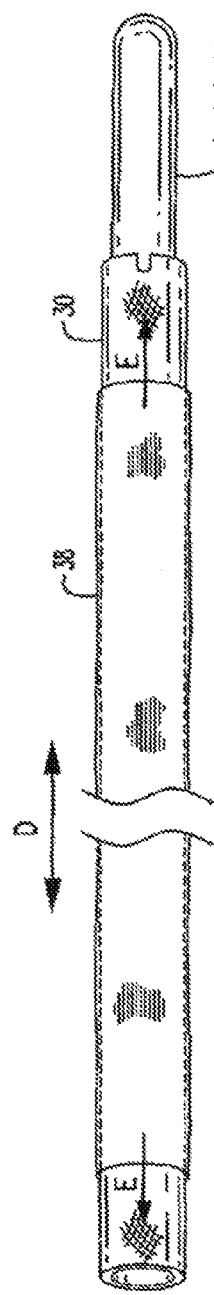
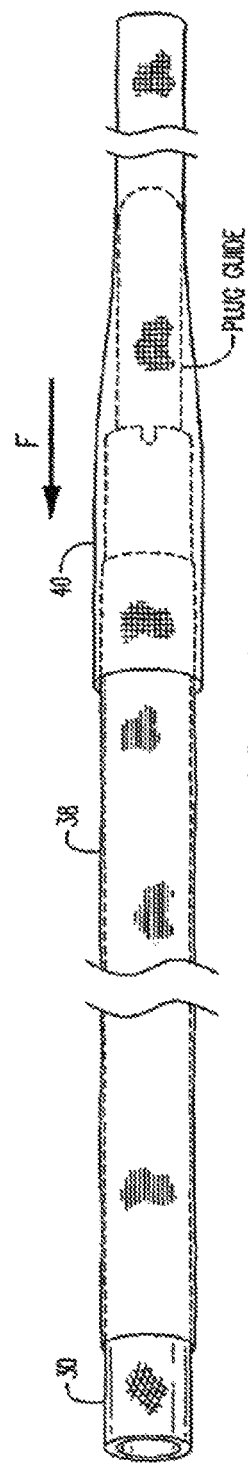
FIG. 9
FIG. 10

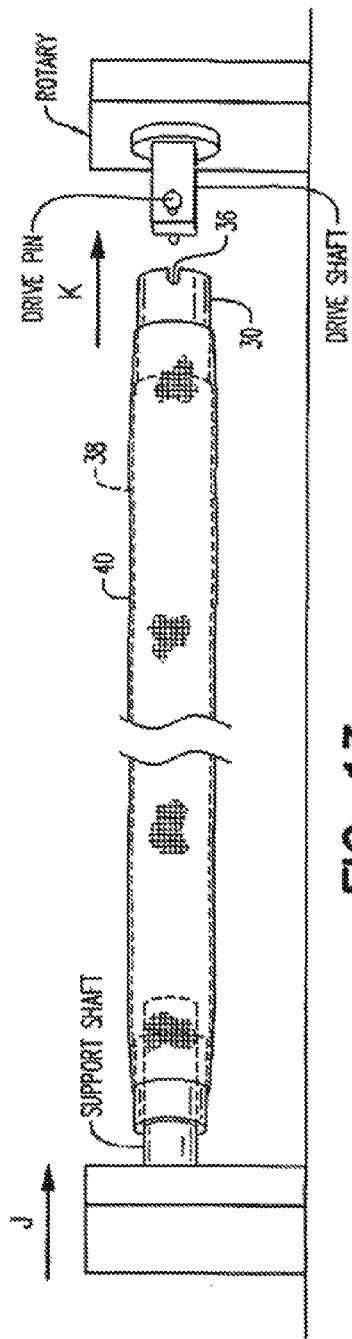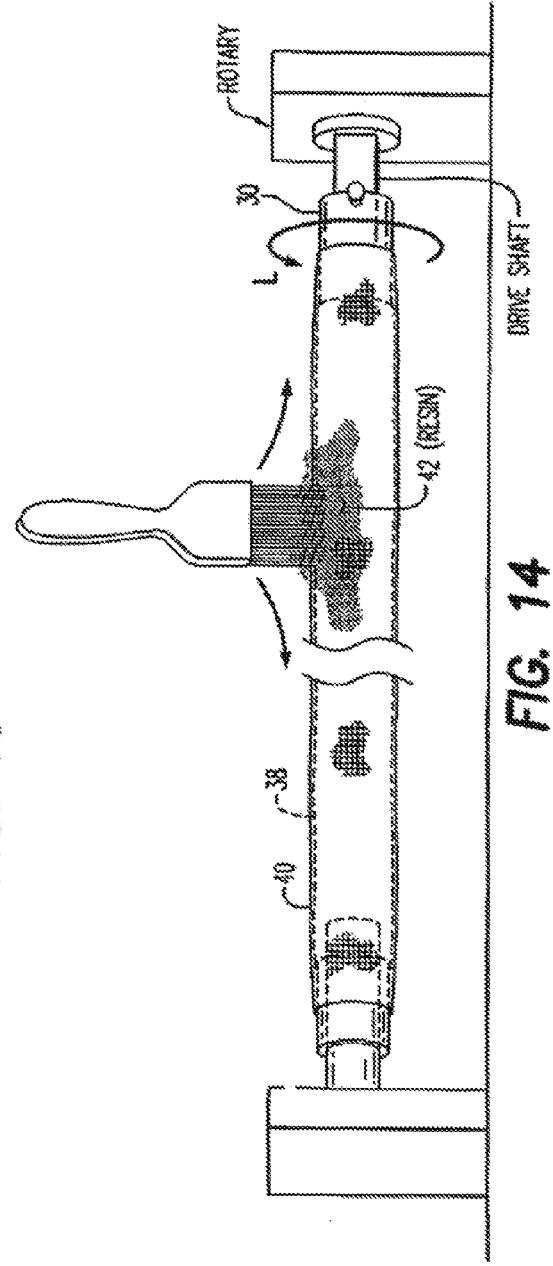

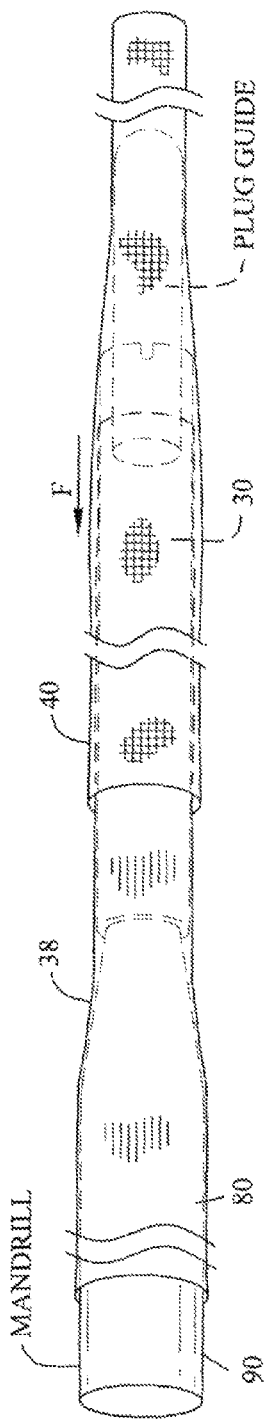
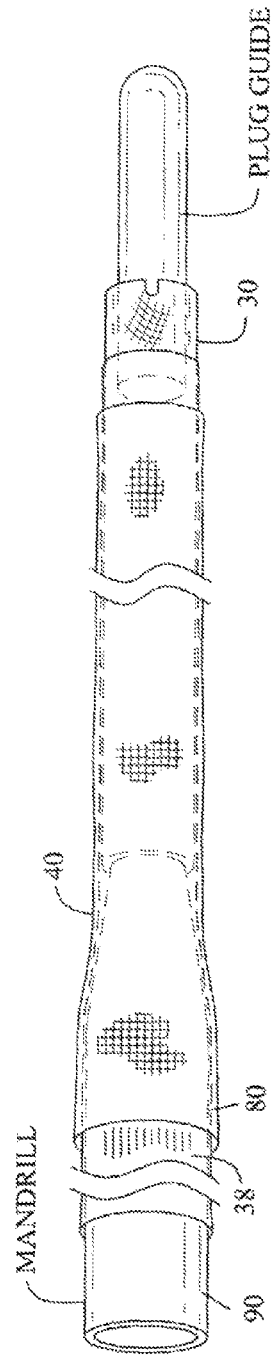

CARBON FIBER TUBULAR POLE AND METHOD OF MANUFACTURE

BACKGROUND OF THE INVENTION

1. Field of the Invention

This invention relates generally to the construction and manufacture of tubular pole members having a distinctive appearance of black carbon fiber, and more particularly to such a pole or contoured support member and method of forming same at a substantially reduced cost of manufacture.

2. Description of the Related Art

Tubular poles and structural contoured members formed of sleeve carbon fiber are well known. The enhanced strength and overall appearance of the black carbon fiber material greatly enhances the strength and aesthetic value despite the greatly exaggerated cost of manufacturing such a product in lieu of similar conventional tubular aluminum product. However, the well-known method for manufacturing such a carbon fiber pole which may typically only be made in a shorter, straight configuration in the carbon fiber industry is through the use of high-tech procedures such as autoclaving and microfilament machines which enable the removal of a mandrel prior to the complete curing of resin saturated into the carbon fiber material. Moreover, when manufacturing smaller diameter carbon fiber tubular members having a diameter of less than 1", removal of the support mandrel becomes exceedingly difficult.

Further, because the cured carbon fiber tubular structure cannot be formed to produce a curve such as for a bow support for a bimini top of a boat, there are no such carbon fiber products in the marketplace at this time.

The present invention provides both a structure and a method for producing both straight tubular and curved tubular support members formed of carbon fiber to provide the strength and distinctive appearance of the black sleeve while substantially reducing the cost of manufacture by simply leaving a sacrificial tubular mandrel in place within the end product structure. A mandrel is any tube made of a synthetic or fibrous material that has the properties of being round, hollow and lightweight. Examples of a synthetic pole may be PVC tubing, plastic tubing or fiberglass tubing. Such a mandrel is preferably in the form of either a light-weight tubular polyvinylchloride (PVC) tubing or cardboard tubing which are left in place and cured and become a monolithic part of the entire structure.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved carbon fiber tubular pole and curved tubular structural member and method of construction thereof. The end product includes a left in-place lightweight mandrel, preferably formed of tubular synthetic or fibrous, which substantially reduces cost of manufacture. Moreover, an outer tubular layer of glass fiber over a tubular carbon fiber layer and cured resin saturated through and through fiber layers maintains the aesthetic appearance of the black carbon fiber while substantially strengthening the end product.

The method is also incorporated into the forming of a socket in one end of the carbon fiber tubular pole for receiving a end of an adjacent fiber tubular pole.

It is therefore an object of this invention to provide carbon fiber tubular poles and curved support members which have the outward aesthetic appearance of flat black carbon fiber sleeve.

Still another object of this invention is to provide a carbon fiber tubular structure formed leaving an inner tubular mandrel in place within the structure as a manufacturing support to substantially reduce manufacturing costs.

Yet another object of this invention is to provide a carbon fiber tubular structure which is formed over a precontoured or curved tubular mandrel so as to overcome the limitation that tubular carbon fiber poles currently prohibit the contouring of cured carbon fiber pole stock after the resin has been hardened and cured.

Yet another object of this invention is to provide a method of forming tubular carbon fiber members utilizing slow rotation of the member as the resin is applied to fully saturate the carbon fiber and glass fiber layers all of the way to the tubular mandrel which insures a monolithic-like structure when cured.

The following embodiments and aspects thereof are described and illustrated in conjunction with systems, tools and methods which are meant to be exemplary and illustrative and not limiting in scope. In various embodiments one or more of the abovedescribed problems have been reduced or eliminated while other embodiments are directed to other improvements. In addition to the exemplary aspects and embodiments described above, further aspects and embodiments will become apparent by reference to the drawings and by study of the following descriptions.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIGS. 3 to 15 are side perspective views showing the preferred steps in implementing the method of this disclosure to produce one embodiment of an end pole product of this disclosure.

FIGS. 23 to 30 are side perspective views showing steps in implementing an alternate method of this disclosure to produce a socket in an end pole product of this disclosure.

Figure 1:
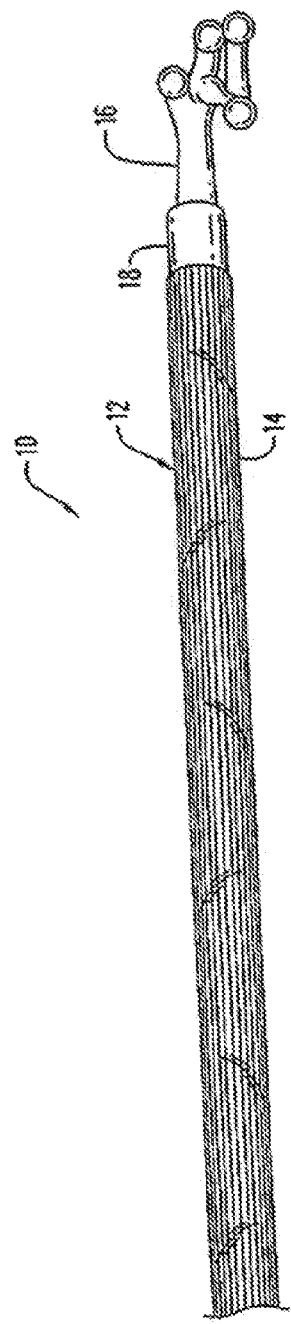
FIG. 1 is a side perspective of one end product produced by the methodology of the disclosure.

Exemplary embodiments are illustrated in reference figures of the drawings. It is intended that the embodiments and figures disclosed herein are to be considered to be illustrative rather than limiting. Similar reference characters refer to similar parts throughout the several Figures of the drawings.

DETAILED DISCUSSION

The following nomenclature is used throughout the specification and drawings.

Figure 2:
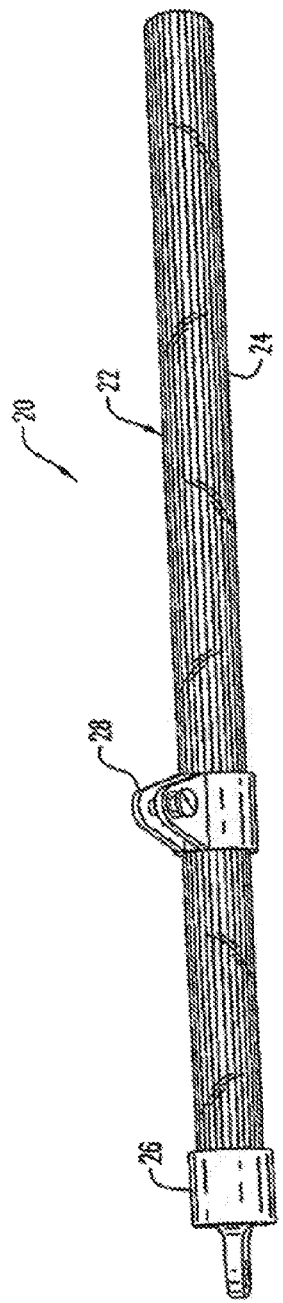
FIG. 2 is a side perspective view of another end product produced by the methodology of the disclosure.

10. boat pole assembly
12. pole assembly
14. pole
16. boat hook
18. finishing end cap
20. bimini brace assembly
22. brace assembly
24. brace
26. end pivot fitting
28. mid-pivot bracket
30. PVC mandrel
32. support rod
34. mandrel outer surface
36. driving notch
38. carbon fiber sleeve
40. glass fiber sleeve
42. uncured resin
42'. cured resin
44. uncured resin/silica
44'. cured resin/silica
46. pole assembly
48. large pole
50. PVC mandrel
52. carbon fiber sleeve
54. glass fiber mat
56. cured resin
58. cured resin/silica
60. PVC bimini mandrel
62. bow segment
64. corner segment
66. upright leg
70. segmented PVC bimini mandrel
72. bow segment
74. upright leg
76. corner segment
78. connector tube
80 socket
90 bell mandrel
91 narrow cylindrical portion
92 tapered portion
93 enlarged cylindrical portion
101 first pole section
101 second pole section
110 end unit
111 end unit
112 washer stop
114 recess
120 elastic cord
122 canvas snap Referring now to the drawings, and firstly to FIGS. 1 and 2, two finished products produced by the methodology of the present disclosure are there shown generally at numerals 10 and 20. In FIG. 1, the boat pole assembly 10 is formed of an elongated pole assembly 12 which includes a tubular carbon fiber pole 14 having a finishing end cap 18 which lockingly receives a boat hook 16 held therewithin, the shaft of which extends partway into the tubular pole 14. The finished appearance shown as being transparent is that of a longitudinally stranded carbon fiber linear sleeve therebeneath. In FIG. 2, a bimini brace is shown at 20 and also includes an elongated carbon fiber brace assembly 22 formed of an elongated tubular carbon fiber 6 pole 24. The bimini brace 20, being shown as a product example, also includes an end fitting 26 and a mid-span pivot bracket 28 lockingly positioned and functioning in a conventional manner.

Figure 3:
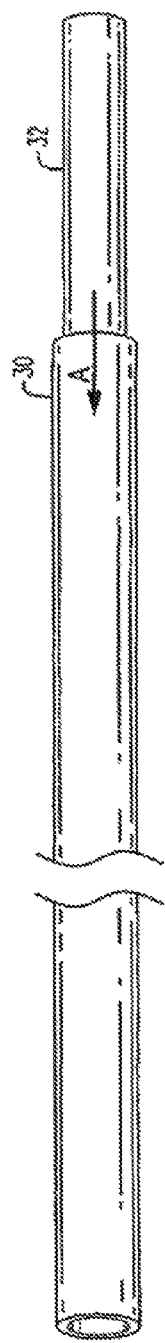
Figure 4:
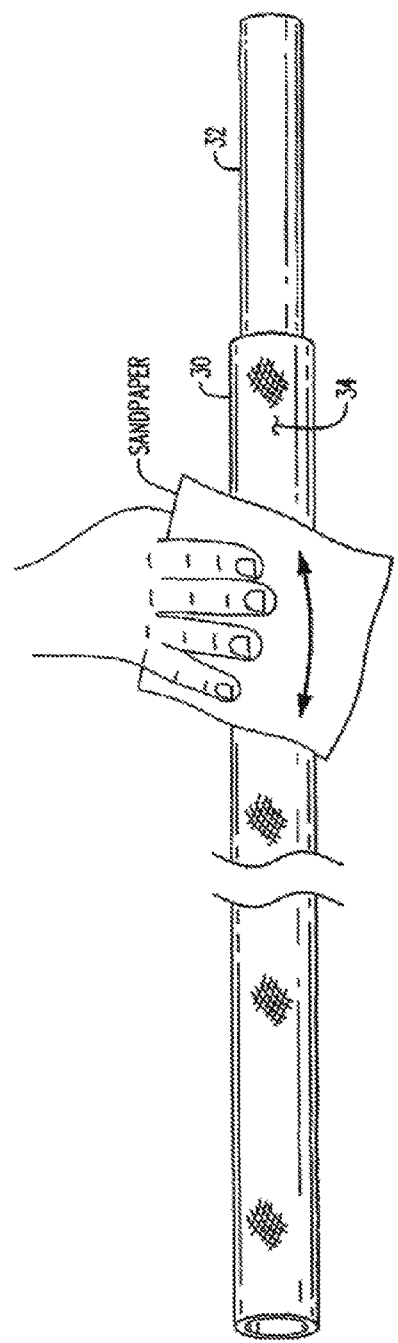

Referring now to FIGS. 3 to 15, the methodology of this disclosure producing the product shown typically shown in FIGS. 1 and 2, is there shown. In FIG. 3, an elongated removable support rod 32, preferably formed of aluminum or copper, is inserted into a length of polyvinylchloride (PVC) mandrel 30, the PVC mandrel 30 forming a permanent part of each end product. The support rod 32 is slid into the hollow interior of the mandrel 30 in the direction of arrow A. Thereafter, the outer surface 34 of the mandrel 30, supported by the support rod 32, is sanded and roughened so as to better adhere to resin applied thereover in a later step.

Figure 5:
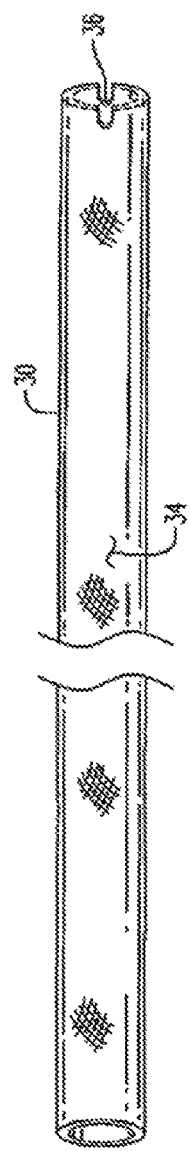
Figure 6:
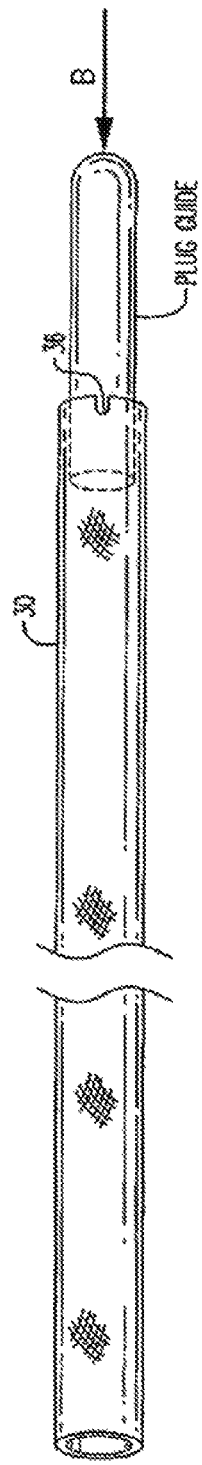
Figure 7:
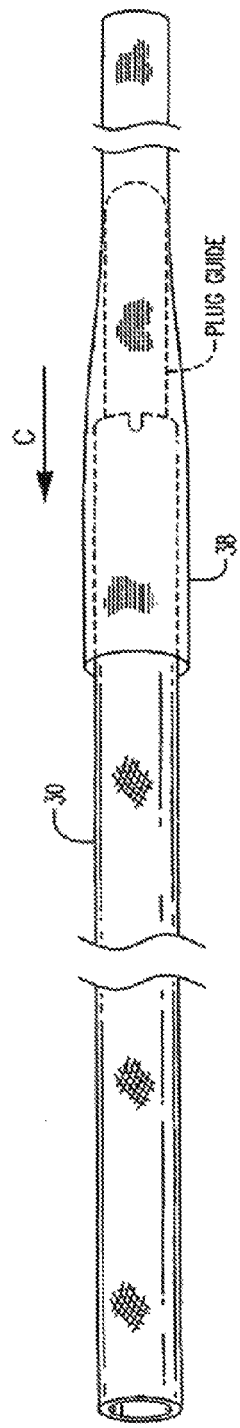
Figure 8:
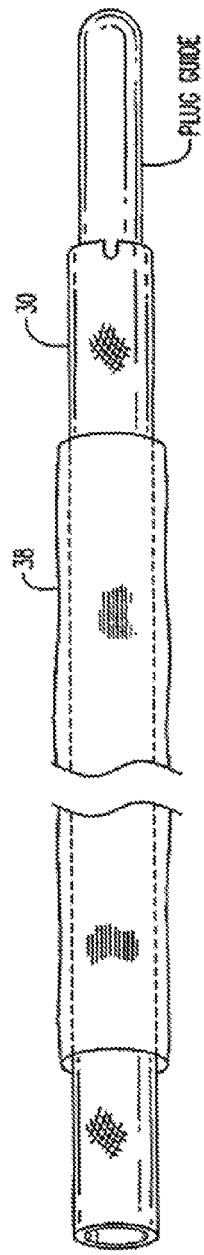
Figure 11:
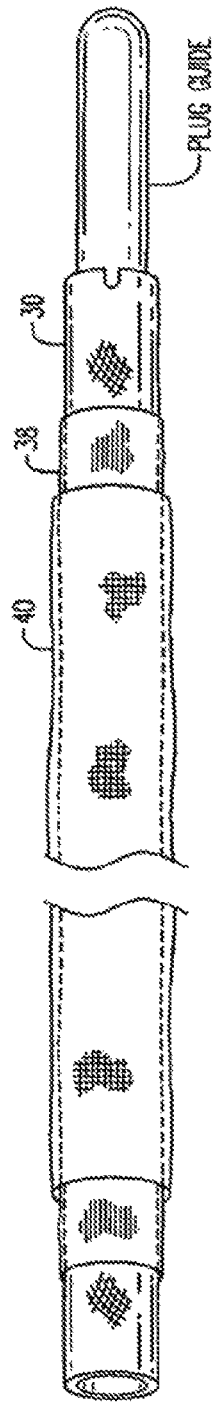

As seen in FIG. 5, driving notches 36 are formed into one end of the mandrel 30 after which a plug guide is slid part way into that same end of the mandrel 30 in the direction of arrow B. The rounded distal end of the plug guide is left exposed so that, as seen in FIG. 7, a length of tubular carbon fiber sleeve 38 may be easily slidingly engaged onto the outer surface of the mandrel 30 in the direction of arrow C. Once this carbon fiber sleeve 38 is fully in place over the mandrel 30 as shown in FIG. 8, the carbon fiber sleeve 38 is manually stretched as arrow D in the direction of arrows E in FIG. 9 so as to more tightly conform against the exterior surface of the mandrel 30. Thereafter, as seen in FIG. 10, a length of tubular glass fiber sleeve 40 is slid over the top of the carbon fiber sleeve 38 in the direction of arrow F. Once the glass fiber sleeve 40 is in position over the previously stretched and tensioned carbon fiber sleeve 38, the glass fiber sleeve 40 is also stretched in the direction of arrows G and tensioned in the direction of arrows H by manual manipulation thereof to insure outstretched and tightened position of the glass fiber sleeve 40. This manipulation is similar to the collapsing and tightening of "Chinese handcuffs".

The preferred carbon fiber sleeve is formed of either tubular biaxial or unidirectional carbon fiber material. The preferred glass fiber sleeve is roving biaxial sleeving.

Figure 12:
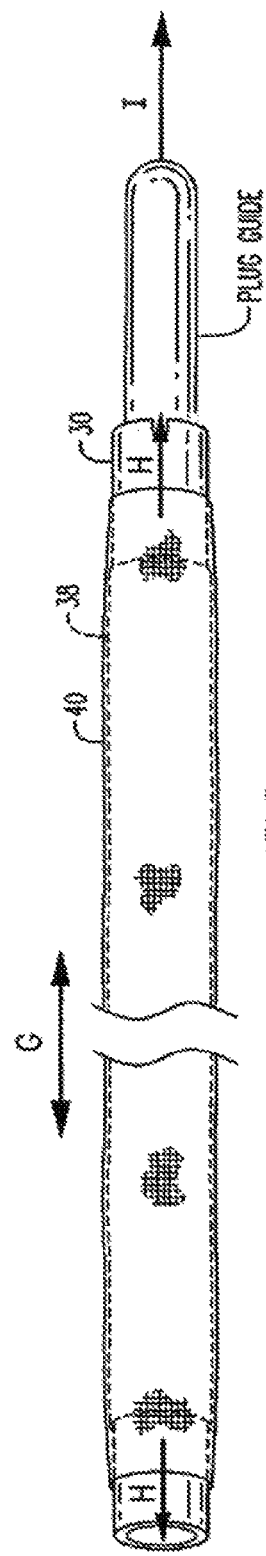

This entire arrangement shown in FIG. 12 is then positioned onto a rotary apparatus by sliding the driving notch 36 into engagement on driving pin of the drive shaft of the rotary, after which the support shaft is moved into the opposite end of the mandrel 30 in the direction of arrow J.

Figure 15:
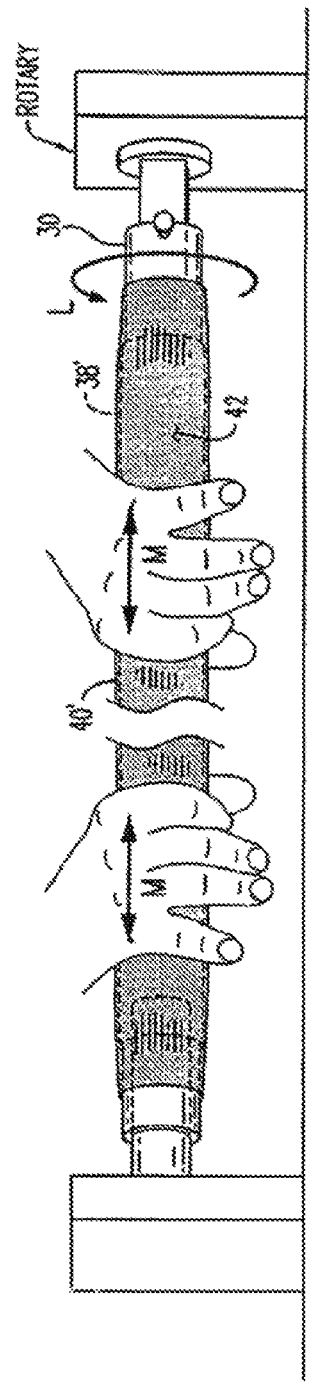

The rotary is then activated to slowly (about 1 to 5 RPM) rotate the mandrel 30 in the direction of arrow L simultaneously with brush application of uncured resin 42 applied over all of the exterior surface of the glass fiber sleeve 40. The resin 42 may be vinyl or polyester epoxy and of sufficiently low viscosity so as to fully penetrate through both the glass fiber sleeve 40 and the carbon fiber sleeve 38 to fully saturate those layers down to the outer surface of the mandrel 30. As seen in FIG. 15, thereafter a user wearing protective vinyl or latex gloves then smoothes the entire arrangement of resin 42, glass fiber and carbon fiber sleeves 38 and 40 by movement manually in the direction of arrows M while squeezing. The preferred resin is a low viscosity epoxy using a non-flushing hardener, slow, medium, or fast curing depending upon ambient temperature.

Figure 16:
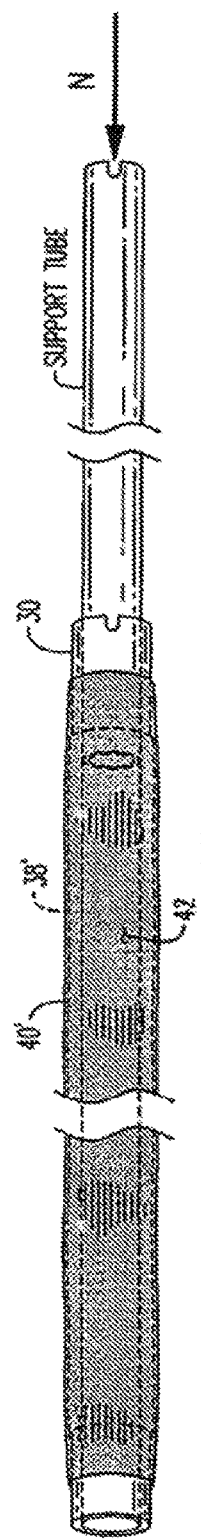
FIG. 16 is a side perspective view showing inserting an alternate support tube within the tubular mandrel for temporarily supporting larger diameter poles during manufacture.

For smaller diameter products, curing of the resin may take place while being held with or without rotation within the rotary shown in FIG. 15. However, where the diameter of the end product exceeds about 1", it is preferred that a support tube be inserted into the mandrel 30 as shown in FIG. 16. The mandrel 30, being non-porous with respect to uncured resin 42, will prevent any resin 42 from contacting the outer surface of the support tube, eliminating any risk that the support tube may not be easily removed after the resin 42 applied to the outer surface shown in FIGS. 14 and 15 has cured.

Figure 17:
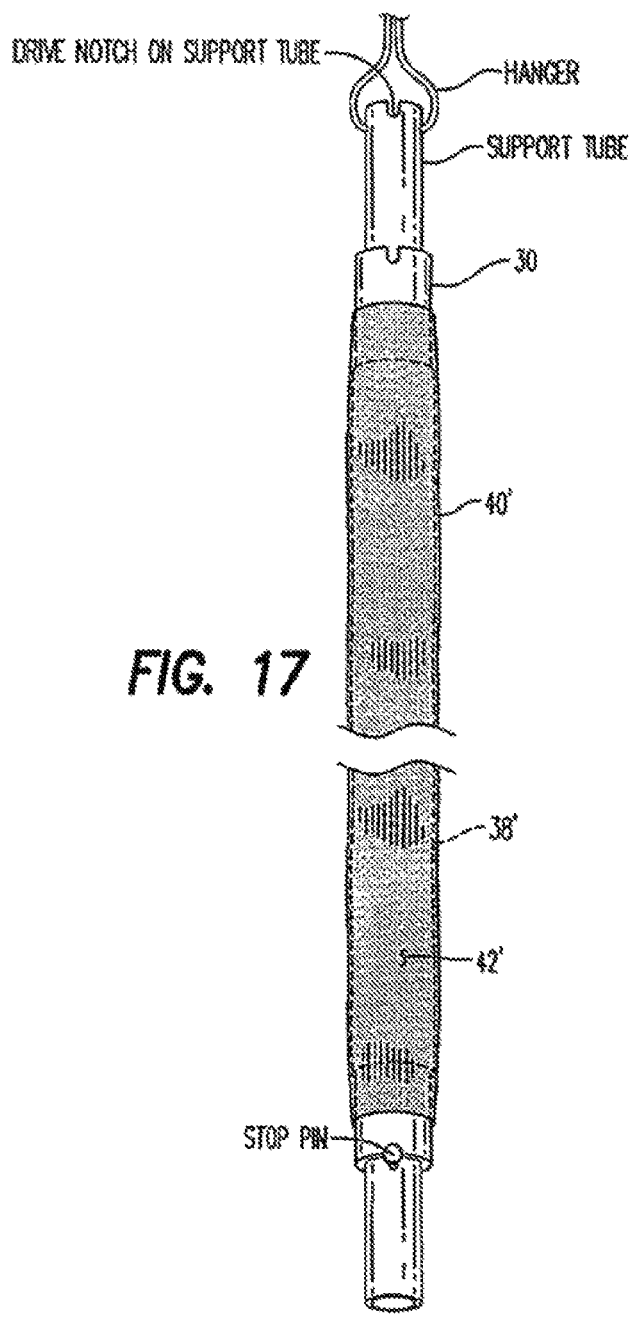
FIG. 17 shows an optional step in the resin curing process for the tubular pole produced in FIG. 16 within the scope of this disclosure.

Once this support tube is inserted in the direction of arrow N as seen in FIG. 16, the ends of the support tube may be held horizontally or, as seen in FIG. 17, for larger diameter end product, the support tube may be attached to and hung vertically by a hanger at an upper end and, to prevent the mandrel 30 from sliding downwardly, a stop pin may be inserted through the opposite end of the support tube. The work product is being held vertically so as to insure a perfectly straight pole end product and without the risk of the resin running which is insured by the careful, even distribution of all uncured resin in the step shown in FIG. 15.

Figure 18:
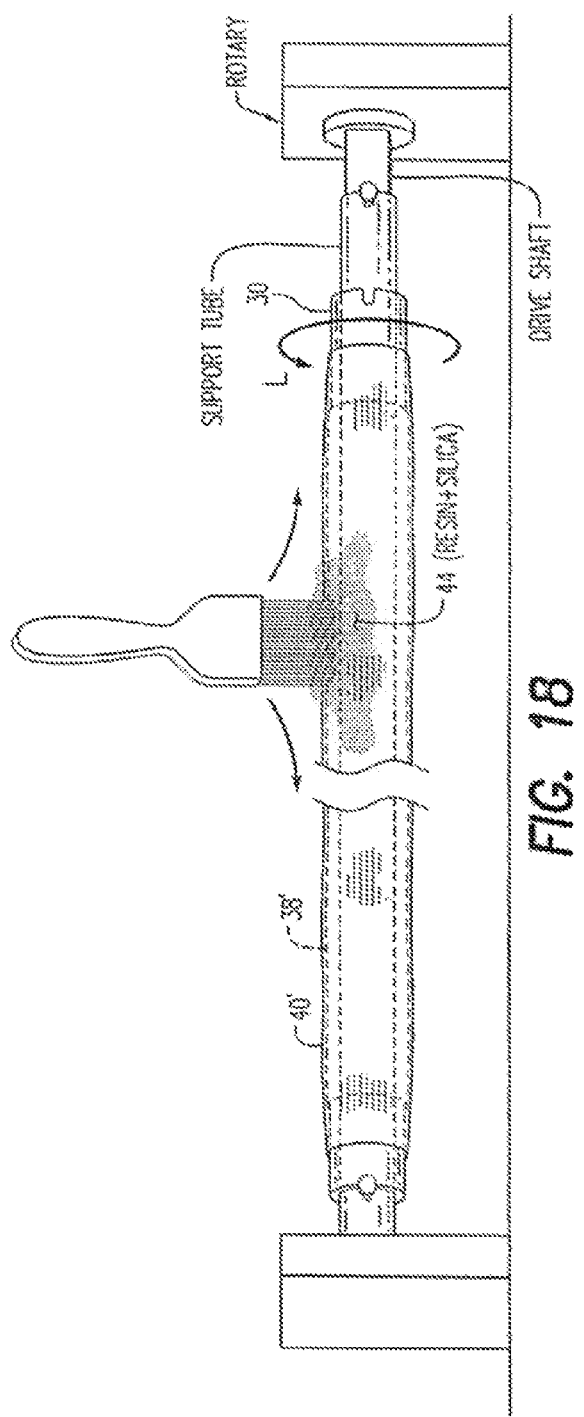
FIGS. 18 and 19 show an optional and preferred step of applying a resin/silica coating over the cured resin (FIG. 18) and hanging the end product vertically for curing (Fia. 19V FIG. 20 is a perspective view of a finished tubular carbon fiber pole.
Figure 19:
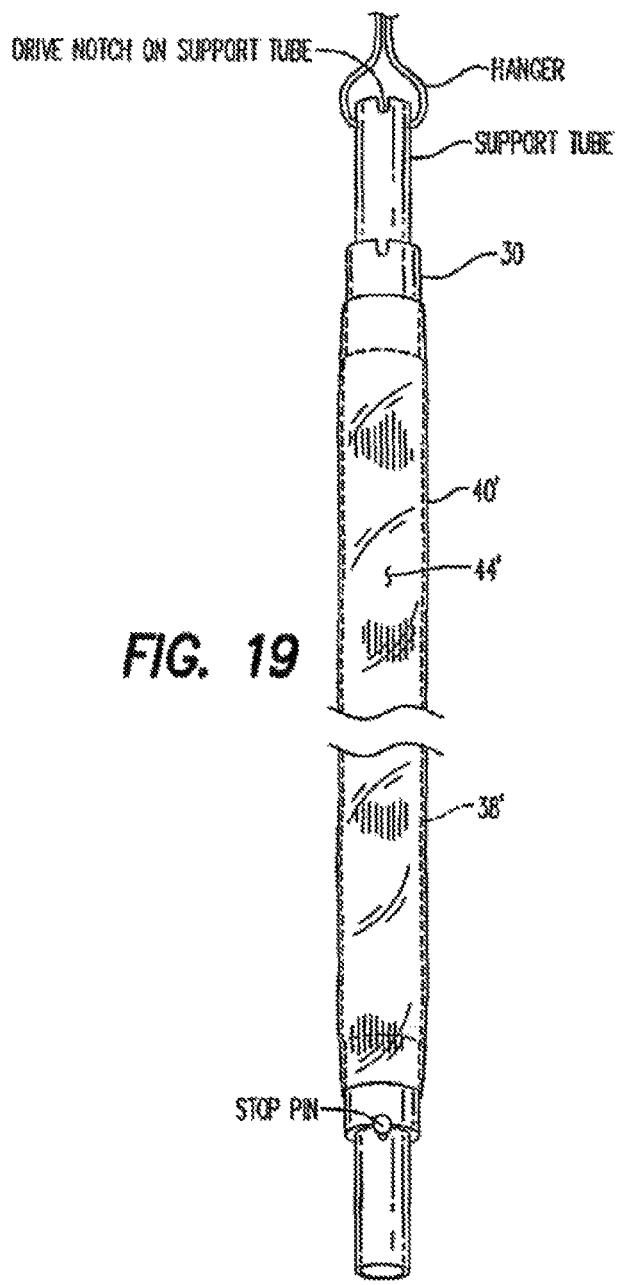

In FIG. 18, after the resin 42 has been cured and hardened, it is preferred that an outer layer of resin in combination with a small quantity of colloidal silica at 44 be brush applied while rotating the work product. Alternately, the entire arrangement is then removed from the rotary into an upright orientation shown in FIG. 19 wherein the hanger is attached to an overhead support after a stop pin has been positioned through a transverse aperture through the support tube at the opposite end thereof. The colloidal silica/resin outer coat 44' provides a more serviceable and smoother surface.

Figure 20:
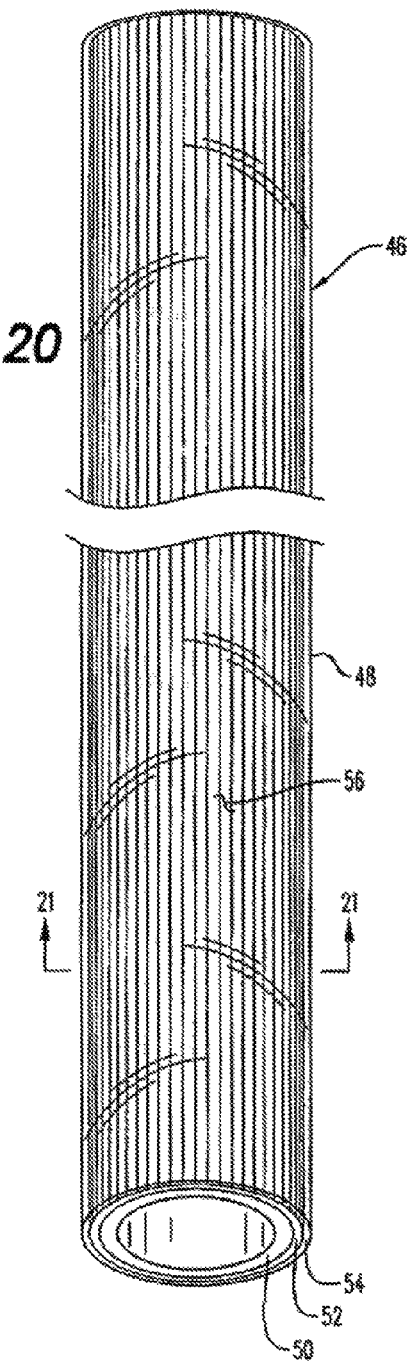
Figure 21:
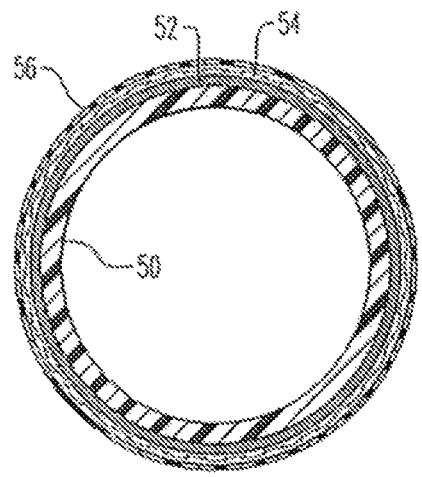
FIG. 21 is a section view in the direction of arrows 21-21 in FIG. 20.
Figure 21A:
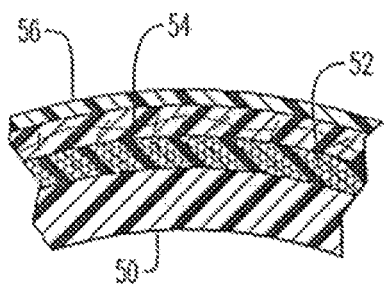
FIG. 21A is an enlarged view of a segment of pole section in FIG. 21.
Figure 21B:
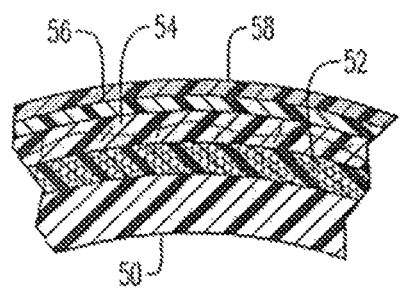

Referring now to FIGS. 20, 21 and 21A, a segment of a length of carbon fiber pole is there shown at 46. Again, the finished carbon fiber 48 has a translucent or transparent visual effect through the cured resin 56 and the outer glass fiber sleeve 54 so that the black carbon fiber sleeve 52 is visible through these combined layers of resin and glass fiber sleeve. As seen in FIG. 21B, the preferred embodiment also includes the outer layer of cured resin with colloidal silica 58 which is applied manually over the cured surface of the resin 56 as previously described.

Figure 22:
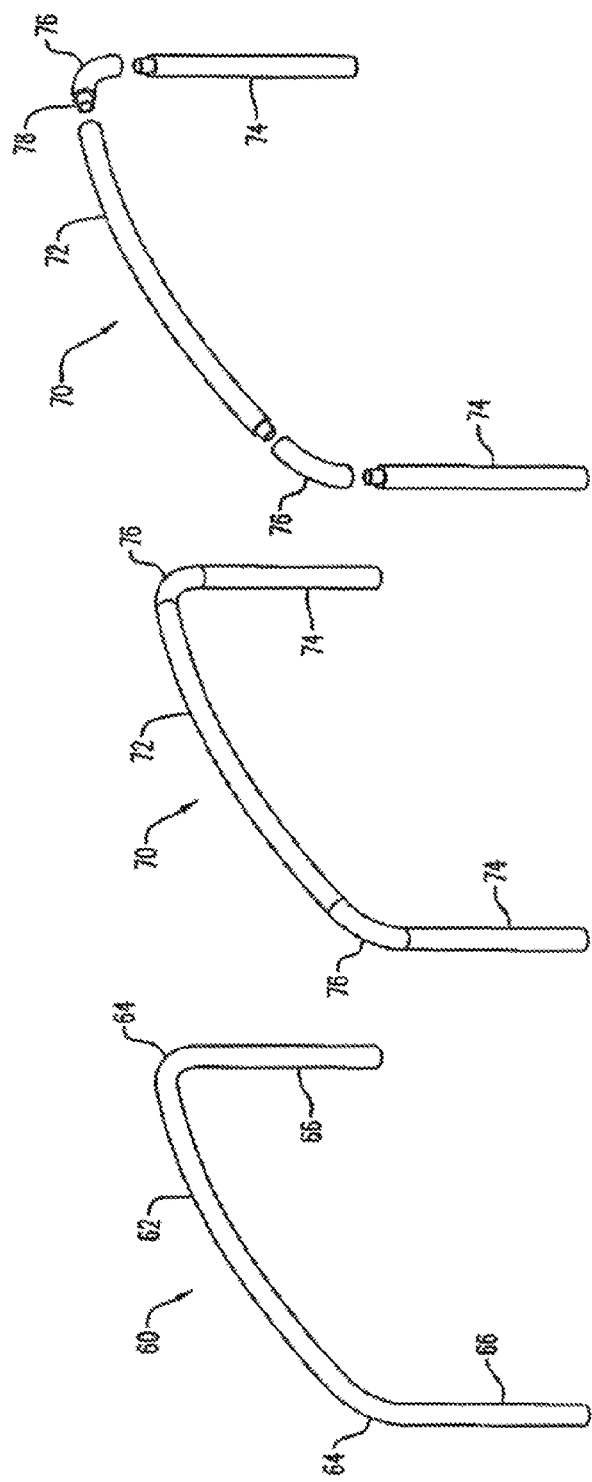
FIG. 22 shows three perspective views of two alternate embodiments of a bimini top support bow or member as well as an exploded view of the second embodiment thereof.

Referring now to FIG. 22, the tubular mandrel aspect of the present invention is applied to curved tubular structural members such as the support bow of a bimini top of a sailboat or power boat. In one embodiment 60, the PVC mandrel 62 is heated and formed at 64 so as to provide straight upright legs 66 and a large radius curved center portion 62 configured as aesthetically dictated for the bimini canvas. Alternately, the PVC mandrel may be formed in segmented portions at 70 wherein the center portion 72 is first heated and formed around a suitable form or manually and then interconnected to tightly bent corners 76 by connectors 78 for attachment to elongated upright tubular portions 74 to form the same desired configuration as with respect to the mandrel 60.

It is again stressed that the important aspect of this invention is that the inner mandrel becomes a permanent part of each hollow carbon fiber pole or contoured product. The resin is saturated through the outer layer of glass fiber and through the inner layer of carbon fiber sleeve to reach and become a monolithic part with the inner tubular mandrel which again may be formed of polyvinylchloride material, cardboard material or any other suitable material which affords a light-weight tubular inner form over which the carbon fiber sleeve, the glass fiber sleeve, and the resin are applied. While a number of exemplary aspects and embodiments have been discussed above, those of skill in the art will recognize certain modifications, permutations and additions and subcombinations thereof. It is therefore intended that the following appended claims and claims hereinafter introduced are interpreted to include all such modifications, permutations, additions and subcombinations that are within their true spirit and scope.

FIGS. 23 to 30 are side perspective views showing steps in implementing an alternate method of this disclosure to produce a socket 80 in an end pole product of this disclosure.

Figure 23:
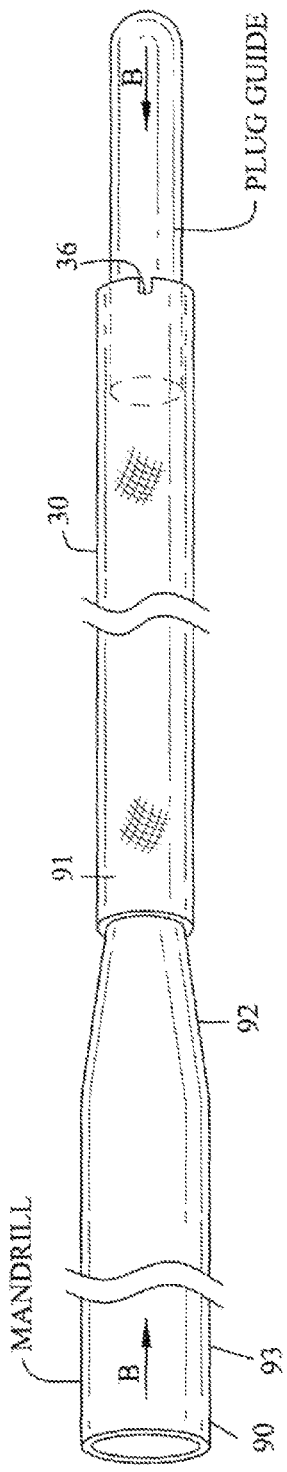

FIG. 23 illustrates a plug guide being slid part way into one end of the mandrel 30 in the direction of arrow B. A bell mandrel 90 has a narrow cylindrical portion 91, an enlarged cylindrical portion 92 and an intermediated tapered portion 93. The narrow cylindrical portion 91 is inserted into the other end of the mandrel 30

Figure 24:
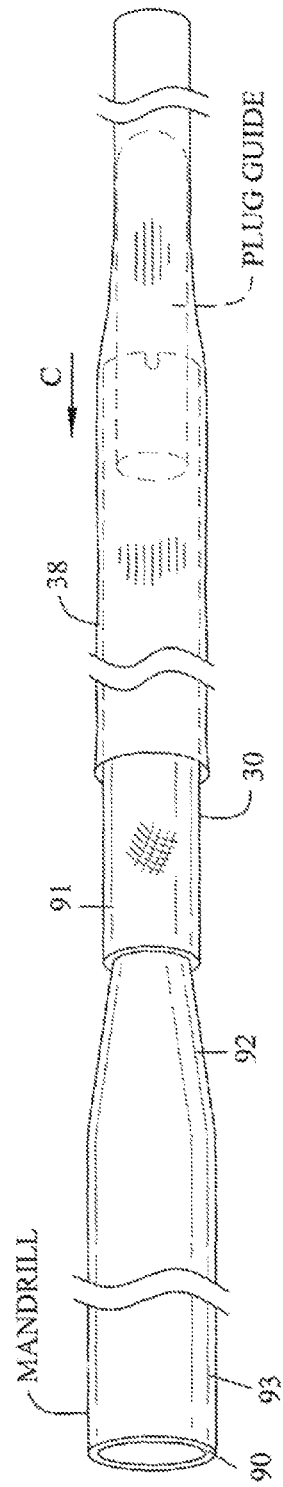

FIG. 24 illustrates a length of tubular carbon fiber sleeve 38 being slidingly engaged onto the outer surface of the mandrel 30 in the direction of arrow C.

Figure 25:
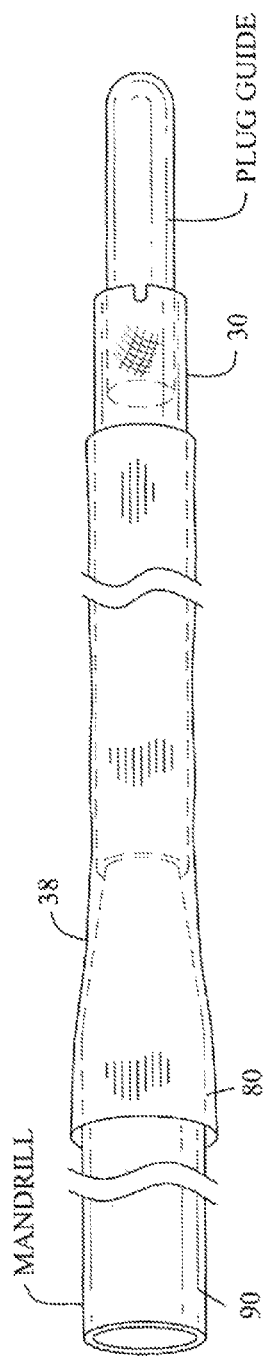

FIG. 25 illustrates the carbon fiber sleeve 38 is fully in place over the mandrel 30 and the intermediated tapered portion 93 and the enlarged cylindrical portion 92 of the bell mandrel 90.

Figure 26:
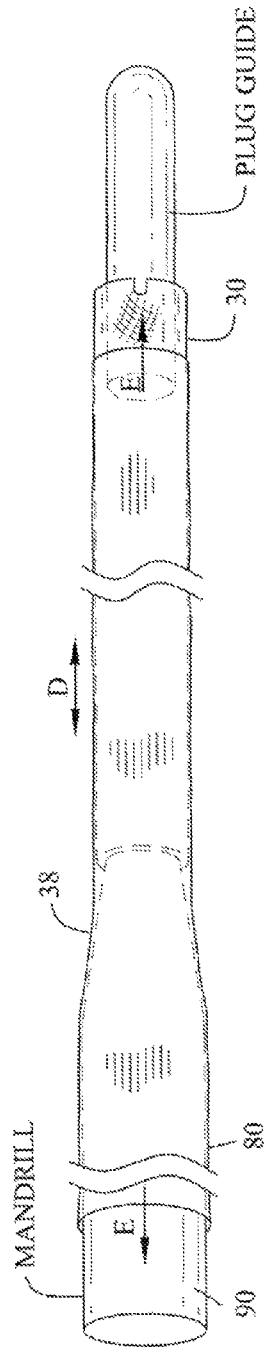

FIG. 26 illustrates the carbon fiber sleeve 38 being manually stretched as arrow D in the direction of arrows E so as to more tightly conform against the exterior surface of the mandrel 30 and the intermediated tapered portion 93 and the enlarged cylindrical portion 92 of the bell mandrel 90.

FIG. 27 illustrates a length of tubular glass or carbon fiber sleeve 40 is slid over the top of the carbon fiber sleeve 38 in the direction of arrow F.

FIG. 28 illustrates the length of tubular glass or carbon fiber sleeve 40 positioned over the previously stretched and tensioned carbon fiber sleeve 38 overlaying the intermediated tapered portion 93 and the enlarged cylindrical portion 92 of the bell mandrel 90.

Figure 29:
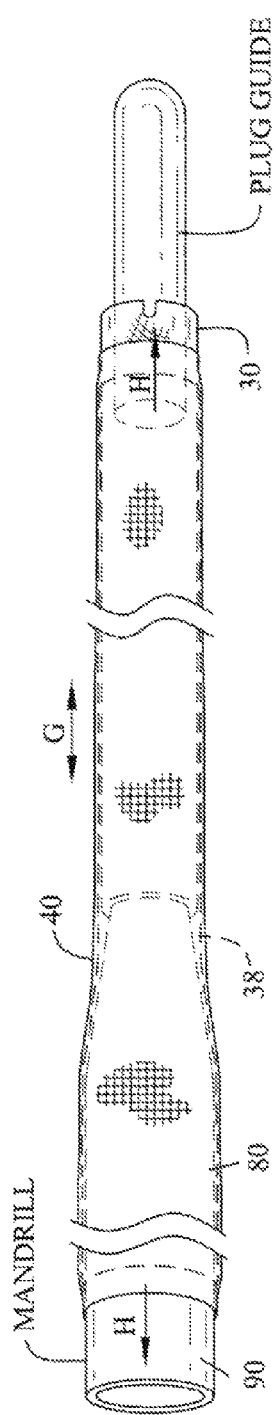

FIG. 29 illustrates the glass or carbon fiber sleeve 40 being stretched in the direction of arrows G and tensioned in the direction of arrows H by manual manipulation thereof to insure outstretched and tightened position of the glass fiber sleeve 40.

Figure 30:
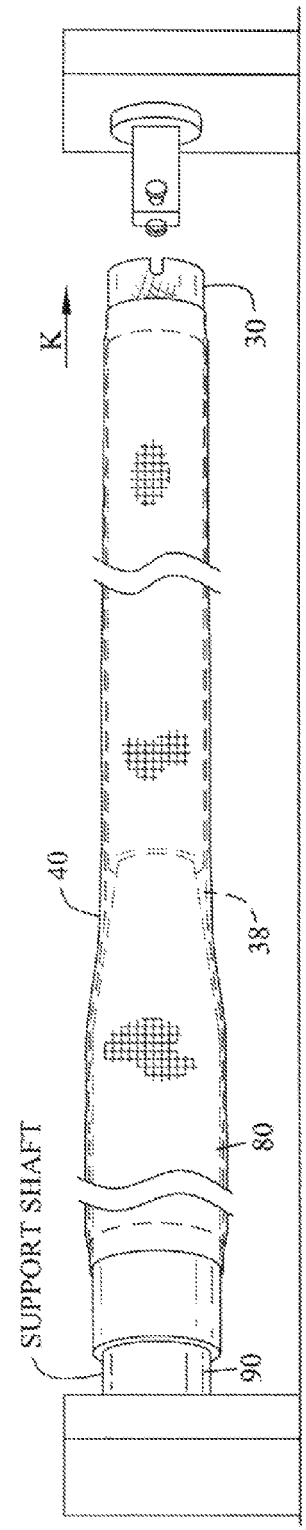

FIG. 30 illustrates the entire arrangement shown being positioned onto a rotary apparatus in a manner similar to the explanation previously referred to with reference to FIG. 13.

The assembly is process in a manner as set forth in FIGS. 14 to 19. Thereafter the bell mandrel is removed to from the formed socket 80.

Figure 31:
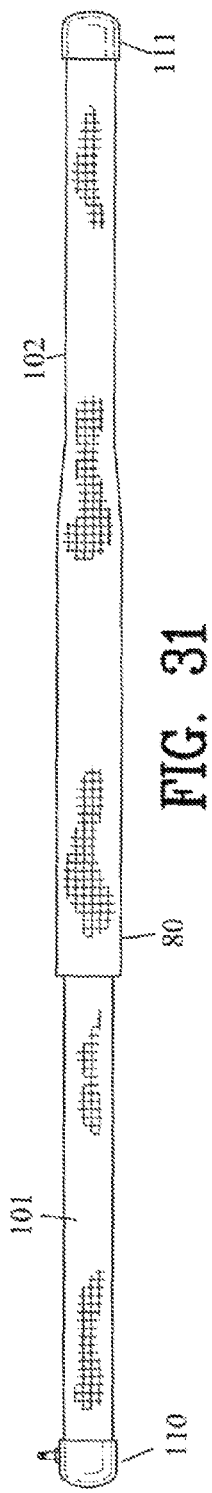
FIG. 31 is an assembled view of a first pole section of FIGS. 3 to 15 inserted into the socket of a second pole section of FIGS. 23 to 30.

FIG. 31 is an assembled view of a first pole section 101 of FIGS. 3 to 15 inserted into the socket 80 of a second pole section 102 of FIGS. 23 to 30. The integral socket enables the first pole section 101 to be inserted into the socket 80 of the second pole section 102 without the need for ferrules. The integral socket provides an increased strength and reduced the cost of the carbon fiber tubular pole.

Figure 32:
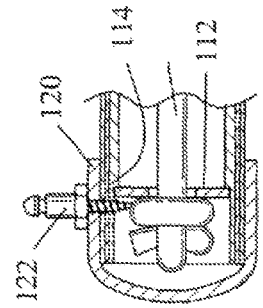
FIG. 32 is a sectional view along line 32-32 in FIG. 31.

FIG. 32 is a sectional view along line 32-32 in FIG. 31 illustrating an end unit 110 of the first pole sections 101. The second pole section 102 is fitted with a similar end unit 111. The end unit 110 comprises a washer stop 112 disposed in a recess 114 formed in the end of the first pole sections 101. An elastic cord 120 is stretched between the end unit 110 of the first pole sections 101 and a similar end unit 111. The elastic cord 120 maintains the first pole sections 101 inserted within the socket 80 of the second pole section 102. The end units 110 and 11 also include a canvas snap 122 (lift-a-dot) for mounting a canvas awning or the like.

Figure 33:
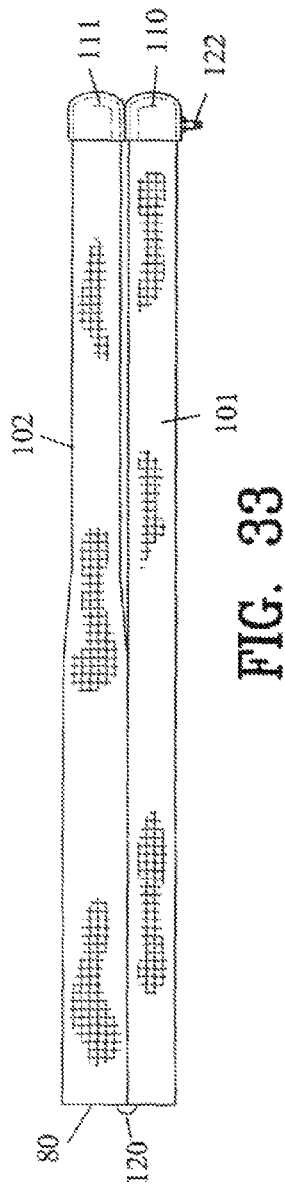
FIG. 33 is a view of the first and second pole sections of FIG. 30 in a folded position.

FIG. 33 is a view of the first and second pole sections of FIG. 30 in a folded position. The first pole section 101 is removed from the second pole section 102 and may be bent 180 degrees for easy storage.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

We claim:

1. A method of making a carbon fiber tubular pole comprising:
   a. sliding and stretching a carbon fiber sleeve over an elongated tubular mandrel and an enlarged bell mandrel;
   b. sliding and stretching a fiber sleeve over said carbon fiber sleeve;
   c. saturating said sleeves with a sufficient quantity of a curable resin through to said mandrel;
   d. smoothing and further stretching the uncured resin saturated sleeves;
   e. allowing said uncured resin to cure and monolithically permanently secure said tubular mandrel and said sleeves together
   f. removing the enlarged bell mandrel to provide a socket.

2. A method of making a carbon fiber tubular pole comprising:
   a. sanding an outer surface of an elongated tubular mandrel;
   b. sliding and stretching a carbon fiber sleeve over a substantial length of said tubular mandrel and an enlarged bell mandrel;
   c. sliding and stretching a fiber sleeve over a substantial length of said carbon fiber sleeve;
   d. saturating said sleeves with a sufficient quantity of a curable resin through to said mandrel;
   e. smoothing and further stretching the uncured resin saturated sleeves;
   f. allowing said uncured resin to cure and permanently secure said tubular mandrel and sleeves monolithically together;
   g. removing the enlarged bell mandrel to provide a socket for receiving an adjacent carbon fiber tubular pole.

3. The method of claim 1, further comprising:
   g. after step f, applying a mixture of colloidal silica and resin over the cured resin.

4. The method of claim 2, further comprising:
   h. after step g, applying a mixture of colloidal silica and resin over the cured resin.

* * * * *